US007631029B2

(12) United States Patent
Marsili

(10) Patent No.: US 7,631,029 B2
(45) Date of Patent: Dec. 8, 2009

(54) DEVICE AND METHOD FOR DETECTING A USEFUL SIGNAL IN A RECEIVER

(75) Inventor: Stefano Marsili, Fürnitz (AT)

(73) Assignee: Infineon Technologies AG, Neubiberg (DE)

( * ) Notice: Subject to any disclaimer, the term of this patent is extended or adjusted under 35 U.S.C. 154(b) by 907 days.

(21) Appl. No.: 11/091,956

(22) Filed: Mar. 25, 2005

(65) Prior Publication Data

US 2005/0220212 A1 Oct. 6, 2005

Related U.S. Application Data

(63) Continuation of application No. PCT/DE03/02866, filed on Aug. 28, 2003.

(30) Foreign Application Priority Data

Sep. 26, 2002 (DE) ................................ 102 45 039

(51) Int. Cl.
*G06F 17/15* (2006.01)
*H04L 27/06* (2006.01)

(52) U.S. Cl. ...................................... 708/422; 375/343

(58) Field of Classification Search ................. 708/311, 708/312, 422

See application file for complete search history.

(56) References Cited

U.S. PATENT DOCUMENTS 5,705,949 A 1/1998 Alelyunas et al.
2004/0008850 A1* 1/2004 Gustavsson .................. 381/92
2004/0052319 A1* 3/2004 Wakamatsu ................. 375/343
2004/0161120 A1* 8/2004 Petersen et al. ............... 381/92

FOREIGN PATENT DOCUMENTS

EP 1 120 944 A2 1/2001
EP 1 093 268 A2 4/2001
EP 1 179 901 A1 2/2002

OTHER PUBLICATIONS

PCT/DE03/02866, "Communication over the transmission of the international investigation report", 6 pages, Jan. 30, 2004.
PCT/DE/02866, "International preliminary test report", 6 pages, Dec. 30, 2004.
Van de Beek, et al., "Low-Complex Frame Synchronization in OFDM System", Lulea University of Technology, Sweden, Fourth IEEE International Conference, pp. 982-986, 1995.
IEEE Std 802.11a-1999, "Part 11: Wireless LAN Medium Access Control (MAC) and Physical Layer (PHY) Specifications: High-speed Physical Layer in the 5GHz Band", Supplement to IEEE Std 802.11-1999, 83 pages, 1999.

(Continued)

*Primary Examiner*—Chuong D Ngo
(74) *Attorney, Agent, or Firm*—Dicke, Billig & Czaja, PLLC

(57) ABSTRACT

The device for detecting a useful signal comprises an auto-correlation unit (AK) for autocorrelating a signal (s(t)) which can contain a periodic signal, and a cross correlation unit (CK) for cross correlating the signal s(t) with a known signal (b(t)). Further, the device comprises a logic unit (VE) for logically combining outputs of the autocorrelation unit (AK) and of the cross correlation unit (CK) which outputs a combinatorial signal (d(t)) which specifies whether the useful signal has been detected.

20 Claims, 6 Drawing Sheets

OTHER PUBLICATIONS

Amendment to IEEE Std 802.11, "Wireless LAN Medium Access Control (MAC) and Physical Layer (PHY) Specifications, Further Higher Data Rate Extension in the 2.4 GHz Band", 67 pages, 2003.

ETSI TS 101 761-1 V.1.1.1, "Broadband Radio Access Networks (BRAN); HIPERLAN Type 2; Data Link Control (DLC) Layer, Part 1: Basic Data Transport Functions", 2000.

Schwoerer, et al."VLSI Implementations of IEEE 802.11a Physical Layer", 6th International OFDM-Workshop (InOWo), Hamburg, pp. 28-1 to 28-4, 2001.

Johansson, et al., "Silicon Realization of an OFDM Synchronization Algorithm", Dept. of Applied Electronics, Competence Center for Circuit Design, Lund, Sweden, ICECS '99, 6th IEEE 1999, vol. 1, pp. 319-322, 1999.

* cited by examiner

DEVICE AND METHOD FOR DETECTING A USEFUL SIGNAL IN A RECEIVER

CROSS-REFERENCE TO RELATED APPLICATION

This application is a continuation of copending International Application No. PCT/DE03/02866 filed Aug. 28, 2003 which designates the United States, and claims priority to German application no. 102 45 039.0 filed Sep. 26, 2002.

TECHNICAL FIELD OF THE INVENTION

The present invention generally relates to a device and a method for detecting a useful signal in a receiver, particularly a radio receiver.

DESCRIPTION OF RELATED ART AND BACKGROUND OF THE INVENTION

By now, data transmission rates of up to 54 MBit per second are being achieved in wireless local area networks. The specifications for this can be found in "IEEE 802.11a—Part 11: Wireless LAN Medium Access Control (MAC) and Physical Layer (PHY) specifications: High-speed Physical Layer in the 5 GHZ band" and in "IEEE 802.11g—Part 11: Wireless LAN Medium Access Control (MAC) and Physical Layer (PHY) specifications: Further Higher Speed Physical Layer Extension in the 2.4 GHz Band" or also in "ETSI TS 101 761-1 Broadband Radio Access Networks (BRAN); Hiperlan Type 2: Physical (PHY) Layer". To detect a useful signal, a periodic signal is sought which is sent out at the beginning of a data burst of the useful signal.

FIG. 1 shows a timing diagram in which a periodic signal u(t) with a defined period occurs from a particular time $t_0$ in addition to a noise signal n(t). Along the x axis of the diagram, the time is plotted in units of one sampling period, i.e. the sampling index, and along the y axis the amplitude of the total signal r(t) consisting of the noise signal n(t) and periodic signal u(t) is plotted. The occurrence of the periodic signal u(t) superimposed on the noise signal n(t) must be detected by means of a signal detector. If the signal detector operates faultlessly, it must find by time $t_0$ that there is no periodic signal u(t). The probability of an erroneous detection of the periodic signal must be as low as possible in this period. Once the periodic signal u(t) has occurred at time $t_0$, on the other hand, the signal detector must verify the presence of the periodic signal u(t) as rapidly as possible. The error rate should then also be as low as possible. The periodic signal u(t), and thus the useful signal, should be verified, for example, with a probability of 90% within 4 μs.

FIG. 2 shows a possible use of such a signal detector. The analog complex signal r(t), which contains the noise signal n(t) and may contain the periodic signal u(t), is scaled by means of an amplifier with automatic gain control 1 and supplied to an analog/digital converter 2. The complex digital signal s(t), which can be picked up at the output of the analog/digital converter 2, is supplied to the signal detector 3. In addition, the signal s(t) is supplied to a receiver 4. The signal detector 3 informs the receiver 4 via a signal present at the detector output DA whether a periodic signal has been detected.

Because the amplifier with automatic gain control (AGC) 1 changes the total power, it is not sufficient for detecting the periodic signal u(t) to monitor only the power change of the signal s(t). The amplifier with automatic gain control 1 adapts the signal gain to the requirements from time to time. For this reason, the power fluctuates at the input of the analog/digital converter 2, and thus also at the input DE of the signal detector 3 which is why the change in power in the input signal s(t) does not provide reliable information on the presence or absence of the periodic signal u(t).

FIG. 3 shows the burst structure, as defined in the above-mentioned IEEE specification, which is used for data transmission and for synchronization between transmitter and receiver. The burst structure begins with a preamble STP built up of short training sequences, which is also called PLCP preamble or OFDM training structure. An 0.8-μs-long signal (short training sequence), called $t_1$ in FIG. 3, is repeated 10 times for a total of 8 μs within STP. In FIG. 3, the repetitions are identified by $t_2, t_3, \ldots, t_{10}$. This is followed by a preamble LTP built up of a guard interval GI2 and two long training sequences T1 and T2. LTP also extends over 8 μs. Since LTP and the burst sections SIGNAL, Data1, Data2 following LTP are of no consequence, they will not be discussed further in the text which follows. Explanations relating to these can be found in Section 17.3 of the above-mentioned specification IEEE 802.11a.

To detect a burst at the receiver end, the periodic signal $t_1, t_2, \ldots, t_{10}$ of the preamble STP is used. To detect the periodic signal in the signal s(t), the similarity of the periodic signal $t_1, t_2, \ldots, t_{10}$ to itself can be utilized during a shift according to the signal period. In the case where there is no periodic signal, the signal s(t) should also not exhibit any periodicity.

In the second above-mentioned ETSI specification, the short training sequence is defined slightly differently, but the periodicity of the periodic signal is also present here. Reference is made here to specification sections 5.7 and 5.8. For this reason, the periodic signal u(t) superimposed on the noise signal n(t) can also be detected in the same manner in the case of this specification.

FIG. 4 shows the real part 4.1 and the imaginary part 4.2 of a total of four signals $t_1$ to $t_4$ in the form of a timing diagram in which the sample index is plotted along the x axis and the amplitude in arbitrary units along the y axis. The sampling rate is 20 MHz, i.e. 16 samples correspond to one repetition period (0.8 μs) of the periodic signal u(t). The signals $t_1$ to $t_4$ of the periodic signal, shown in FIG. 4, should be detectable by means of the signal detector 3.

From the prior art "VLSI Implementation of IEEE 802.11a Physical Layer, L. Schwoerer, H. Wirz, Nokia Research Center, 6th International OFDM Workshop 2001—Hamburg, pages 28-1 to 28-4", a signal detector is known which uses the following autocorrelation function for detecting the periodic signal:

$$c_1(t) = \left| \sum_{t_i}^{t_i+T} s(t)s^*(t-\tau) \right| \tag{1}$$

where τ=0.8 μs is the period of the periodic signal u(t) and T is the integration or summation period.

FIG. 5 shows two timing diagrams in which in each case the index of samples is plotted along the x axis and the amplitude along the y axis. The upper diagram shows the complex digital signal s(t). At the index of samples 20, the periodic signal u(t) occurs. In the lower diagram, the autocorrelation function $c_1(t)$ as specified above in the equation (1) is shown. The signal s(t) does not contain a noise signal in this case. The integration or summation period T is 0.8 μs. After 1.6 μs (corresponding to 32 samplings), the last 0.8 μs of the signal s(t) are correlated perfectly with the first 0.8 μs of the signal s(t), and the autocorrelation sum remains constant 1.6 μs after the occurrence of the periodic signal.

In FIG. 6, two timing diagrams are also shown, the upper timing diagram again showing the signal s(t) and the lower timing diagram showing the autocorrelation function $c_1(t)$. The sampling rate is again 20 MHz but the signal s(t) now exhibits a noise signal component. The autocorrelation value $c_1(t)$ is now no longer stable. In addition, the autocorrelation value $c_1(t)$ also deviates from the value 0 even before the periodic signal occurs. To reliably detect the periodic signal, a threshold value must be taken into consideration. If the autocorrelation value $c_1(t)$ exceeds the threshold value, it is assumed that the periodic signal is present. The higher the threshold value, the lower the probability that the autocorrelation according to the abovementioned function $c_1(t)$ falsely detects a periodic signal. The consequence of this is, however, that the higher the threshold value thr_ac, the longer it takes until the periodic signal is detected.

The value of the autocorrelation $c_1(t)$ is also dependent on the power of the signal s(t). The threshold value must, therefore, be matched to the signal power. The mean value of the power of the signal s(t) is not constant because the variable-gain amplifier 1 arranged upstream of the signal detector 3 attempts to keep the output signal within an interval. This is necessary in order to avoid overdriving the analog/digital converter 2. Even if the input signal, r(t) as shown in FIG. 2 exhibits a constant mean power, it is not possible to set the variable-gain amplifier 1 immediately to the correct value. This first requires a number of adjustments. Due to the gain variation, fluctuations will thus occur in the mean power of the signal s(t) at the input of the signal detector 3 in any case. To this is added that the variable-gain amplifier 1 is normally only set to a fixed final value when the periodic signal has been detected and the useful signal is being received. For this reason, the power must be estimated during the detection process. In the prior art, the following formula is used for estimating the power of the signal s(t):

$$p(t) = \left| \sum_{t_i}^{t_i+T} s(t)s^*(t) \right| \quad (2)$$

The power p(t) is estimated over the last T seconds of the signal s(t) used during the autocorrelation.

The decision as to whether the periodic signal is present or not is made by means of the condition $$c_1(t) \geqq p(t)^* thr\_ac \quad (3)$$

where thr_ac designates the threshold value (not scaled to power) for the autocorrelation. If $c_1(t)$ is greater than or equal to the product of power p(t) and threshold value thr_ac, it is assumed that a periodic signal is present.

The magnitude of the threshold value thr_ac is the result of a trade-off between the desired high reliability of detection of the periodic signal and, on the other hand, the quickest possible detection of the periodic signal.

The block diagram in FIG. 7 shows the configuration of a signal detector 3 which implements the equations specified in the above-mentioned prior art.

The thick lines identify complex signals whereas the thin lines identify real signals.

The signal detector 3 shown as a block diagram in FIG. 7 has an input DE at which the input signal s(t), which is the complex digital output signal of the analog/digital converter 2, is present. The input signal s(t) is supplied to a unit for power estimation 13 which provides at its output the power estimation signal p(t) which was calculated according to equation (2). For this purpose, the unit for power estimation 13 has a unit for squaring an amount 5 and an analog adder 6. At the same time, the signal s(t) is supplied to an autocorrelation unit 15. The autocorrelation unit 15 comprises a unit 9 for forming the conjugate complex signal, a delay unit 10 for delaying the signal s(t) by the period τ, and a multiplier 16 which multiplies the signal s(t) by the delayed complex conjugate signal s*(t−τ). Following the multiplier 16, an analog adder 11 with the adding period T and a unit for absolute-value generation 12 are arranged. The output of the autocorrelation unit 15 is connected to a first input of a decision unit 14. At a second input of the decision unit 14, the threshold value thr_ac is present. A third input of the decision unit 14 is connected to the output of the unit for power estimation 13. The threshold value thr_ac is scaled by means of the multiplier 7. The threshold value condition according to equation (3) is checked by the comparator 8. At the output DA of the signal detector 3, a detector signal d(t) can be picked up which specifies whether a periodic signal has been detected.

Using autocorrelation for detecting signals has the advantage that the shape of the periodic signal does not need to be known for detecting the periodic signal. To detect the periodic signal, only its period τ must be known. In the case of transmission channels with great distortion or interference, the shape of the received signal is considerably changed compared with the signal transmitted. The period of the transmitted signal remains intact, however. Under these transmission conditions, the signal to noise ratio (SNR), which is needed for the receiver to operate correctly, is normally relatively high—but in any case of such a magnitude that signal detection by autocorrelation can be achieved without problems. In other words: in the case of a channel with high distortion, the problem is not to verify the presence of the (greatly distorted) useful signal by autocorrelation in the detector but to decode the useful signal in the receiver 4.

The conditions are different in the case of an approximately ideal transmission channel. In this case, the SNR required for the receiver to be operable can be very low, possibly down to 0 dB. This means that the receiver can still decode a very noisy useful signal. The situation may occur where even though the receiver could decode the almost distortion-free, very noisy useful signal, the detector performing the autocorrelation is not capable of indicating the presence of the useful signal. In other words: in the case of an approximately ideal channel, the problem consists in detecting the signal (verification of the presence of the useful signal) in the signal detector 3, not in the subsequent signal decoding in the receiver 4.

The problems in signal detection impair the performance of the system consisting of receiver 4 and detector 3. Receiver 4 and detector 3 form a total system which appears to exhibit an increased error rate. The increased error rate disadvantageously results in additional retransmissions. This lastly results in a reduction in the data throughput for the overall system.

SUMMARY OF THE INVENTION

It is an object of the invention to specify a device and a method for detecting a useful signal which enable a good performance of the overall system to be achieved even with different channel conditions. In particular, the useful signal should be detected both reliably and rapidly with the least possible implementation expenditure even for a channel with low distortion but high noise.

The device according to the invention for detecting the presence of a useful signal containing a periodic signal accordingly comprises an autocorrelation unit for autocorrelating a signal in which the useful signal may be present, a cross correlation unit for cross correlating the signal with a known signal, and a logic unit for logically combining the outputs of the autocorrelation unit and of the cross correlation unit, which outputs a combinatorial signal which specifies whether the useful signal is present in the signal.

The method according to the invention for detecting the presence of a useful signal containing a periodic signal exhibits the following steps: a signal, in which the useful signal may be present, is correlated with a delayed version of itself by means of an autocorrelation and an autocorrelation signal is formed. In addition, the signal is correlated with a known signal by means of a cross correlation and a cross correlation signal is formed. The autocorrelation signal and the cross correlation signal are then logically combined with one another and a combinatorial signal is formed which species whether the useful signal is present in the signal.

The basic concept of the invention consists in extending the useful signal detection by means of autocorrelation, already known, by means of a useful signal detection by means of cross correlation. Cross correlation procedures are known per se, but are typically used for synchronization tasks in mobile radio receivers and not for signal detection (verification of the presence of a useful signal).

In signals with a high noise level, the essential advantage of cross correlation compared with autocorrelation consists in that the known signal does not supply a noise contribution and, in consequence, there is no product as in equation (1) in which two noisy factors s(t) and $s^*(t-\tau)$ are multiplied by one another. The result is better noise immunity in the signal detection.

Advantageous developments of the invention are found in the features specified in the dependent claims.

The device according to the invention preferably comprises an amplitude estimating unit for estimating the amplitude of the signal (s(t)), the amplitude estimation signal output by the amplitude estimating unit being supplied to the logic unit. In this manner, it is possible to achieve that varying signal strengths do not have any influence on the useful signal detection or only very little influence.

According to a further preferred embodiment of the invention, the logic unit comprises a first decision unit, connected downstream of the autocorrelation unit, which outputs a first logic signal which specifies whether the useful signal has been detected by autocorrelation, a second decision unit, connected downstream of the cross correlation unit, which outputs a second logic signal which specifies whether the useful signal has been detected by cross correlation, and an OR element, connected downstream of the two decision units, which outputs the combinatorial signal. Such a logic unit exhibits low implementation expenditure.

As an alternative to this, the logic unit can also be constructed in such a manner that only a single threshold value decision is performed. In this case, the output signal of the autocorrelation unit and the output signal of the cross correlation unit are in each case weighted and the weighted output signals are logically combined in order to generate the combinatorial signal, e.g. added, and subjected to the threshold value decision.

The device according to the invention and the method can be preferably used in a wireless local area network, particularly according to the IEEE 802.11a standard or the IEEE 802.11g standard or the ETSI TS 101 761-1 (BRAN), Hiperlan Type 2, standard.

BRIEF DESCRIPTION OF THE DRAWINGS

In the text which follows, the invention will be described by means of an exemplary embodiment, referring to the drawing, in which.

DETAILED DESCRIPTION OF PREFERRED EMBODIMENTS

The description of FIGS. 1 to 7 will not be discussed in further detail in the text which follows, but reference is made to the explanations already made in this respect with regard to the invention.

If the transmission channel only exhibits low distortion, it is possible to remove the noise from one of the two factors in equation (1). In this case, the received signal is known and it resembles the transmitted signal, compare also FIG. 4. Thus, the useful signal can be detected also by means of the following equation:

$$c_2(t) = \left| \sum_{t_i}^{t_i+T} s(t)(b^*(t)) \right| \tag{4}$$

where b(t) is a T-second-long signal component of the known transmitted signal. This signal component could be, for example, the signals or symbols $t_1$ and $t_2$ of the preamble STP or also another signal section of the transmitted signal which is known in the receiver. Furthermore, instead of b(t) in equation (4), a signal derived or transformed from b(t) could also be used, e.g. sgn(b(t)), where sgn(•) is the sign function.

Equation (4) describes the cross correlation of the signal s(t) of the known signal b(t) (or a signal derived from the known signal b(t)). The cross correlation is usually used for synchronization. In the solution according to the invention, however, it is used for detecting the useful signal.

Figure 8A:
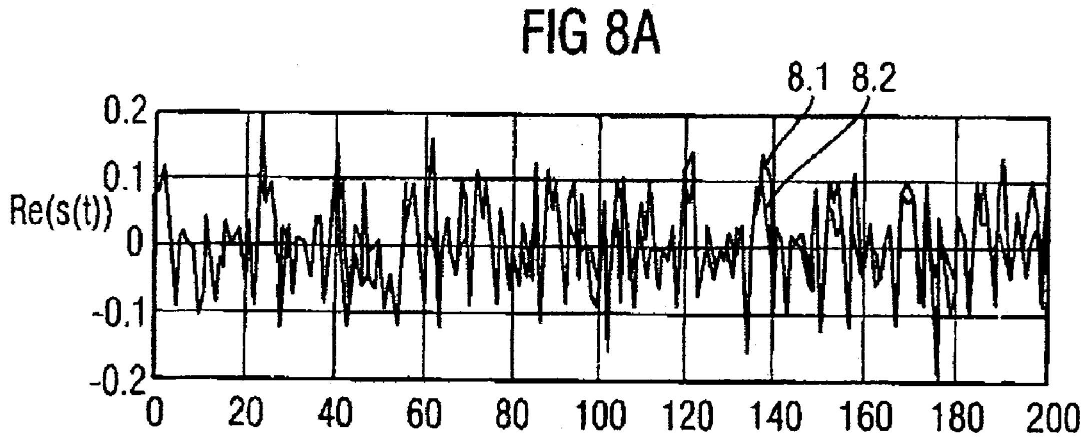
FIG. 8A shows the signal variation of a signal exhibiting a noise component and present at the input of the signal detector.

FIG. 8A shows the useful signal 8.1 on which a noise signal 8.2 is superimposed. Only the real parts of the two signals are shown. The index of sampling values (20 MHz sampling rate)

is plotted along the x axis of the timing diagram and the real amplitude of the total signal s(t) is plotted along the y axis. At the sample with index 20, the useful signal 8.1 occurs. It becomes clear that the useful signal 8.1 is almost "drowned" in the noise, i.e. that a low SNR is present.

Figure 8B:
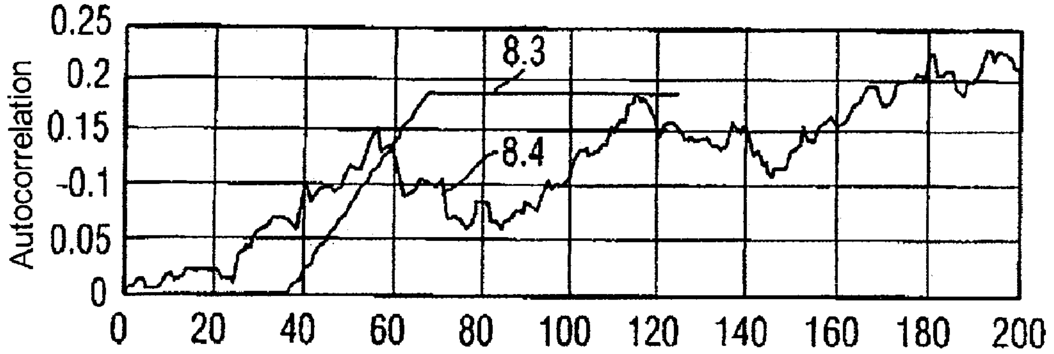
FIG. 8B shows the variation of the autocorrelated signal from FIG. 8A.

FIG. 8B shows the variation of the autocorrelation according to equation (2). Here, too, the index of sampling values is plotted along the x axis and the amplitude is plotted along the y axis. The variation 8.3 here shows the expected variation of the autocorrelation for the noise-free useful signal. The autocorrelation of the useful signal with a noise signal is shown as signal variation 8.4. It can be clearly seen that the signal variation 8.4 deviates greatly from the expected signal variation 8.3. Under certain conditions, the power-controlled threshold value according to equation (3) is not reached in time, which corresponds to an error in the signal reception (the power-controlled threshold value p(t)*thr_ac must be relatively high for keeping down the probability of faulty detection).

Figure 8C:
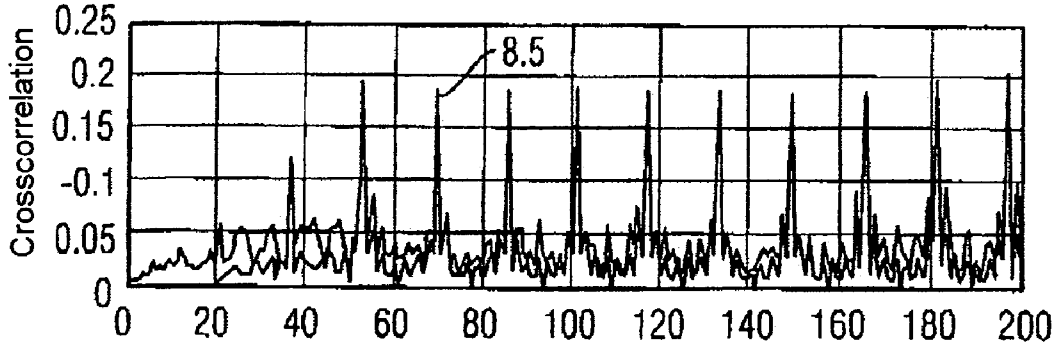
FIG. 8C shows the variation of the cross correlation of the cross-correlated signal from FIG. 8A.

In the timing diagram in FIG. 8C, the variation 8.5 of the cross correlation for the signal shown in FIG. 8A is shown. Here, too, the index of sampling values is plotted along the x axis and the amplitude is plotted along the y axis. The known signal part b(t), also called filter b(t) in the text which follows, has been formed from the two signals $t_1$ and $t_2$ in FIG. 3. The peaks in FIG. 8C, which are independent of the filter length, occur every 0.8 μs. Their values have not been greatly distorted by the noise. As already mentioned, these peaks are normally used for synchronizing a signal. In the present case, however, they are used for detecting the useful signal. For this purpose, another threshold value thr_cc is selected compared with the threshold value thr_ac used during the autocorrelation. The selected threshold value thr_cc must ensure that false detection is impossible with a certain probability.

As in equation (1), the output value $c_2(t)$ of equation (4) depends on the signal strength. Since in equation (4), only one of the two factors depends on the signal strength, however, the amplitude of the signal s(t) and not its power must be taken into consideration. This can be done, for example, by extracting the square root of p(t) according to equation (2) and using it for scaling the threshold value thr_cc.

As an alternative, it is also possible to work with an approximation. The following equation can be used for approximating the signal amplitude:

$$m(t) = \sum_{t_i}^{t_i+T} (|\mathrm{Re}(s(t))| + |\mathrm{Im}(s(t))|) \tag{5}$$

This leads to a further detection criterion:

$$c_2(t) \geqq m(t)^* thr\_cc \tag{6}$$

where thr_cc is the second threshold value (threshold value for the cross correlation).

I.e., as soon as correlation peaks occur which are higher than the product m(t)*thr_cc, a detection of the useful signal is assumed. Furthermore, the period of these peaks can be used to provide a more rugged algorithm for detecting the useful signal.

Figure 9:
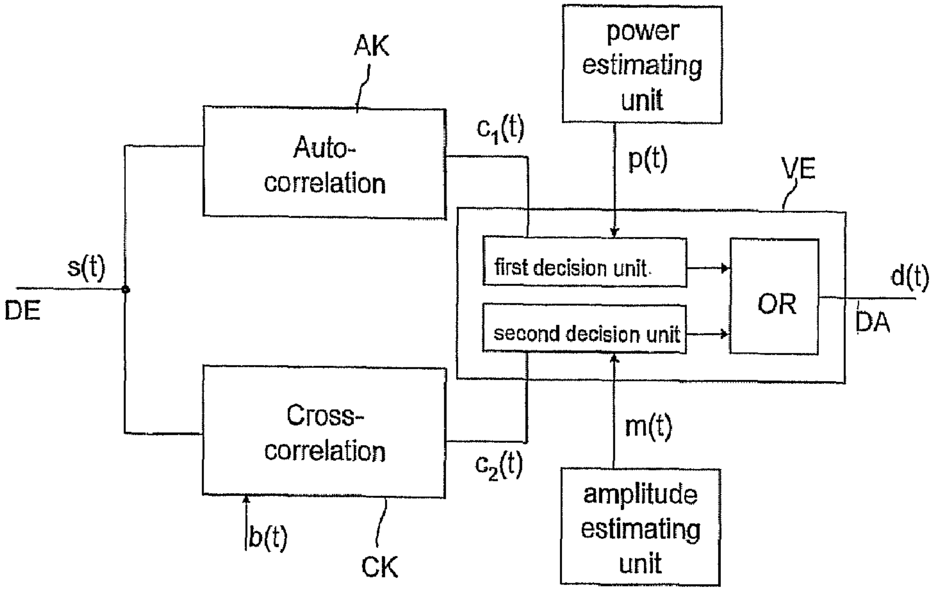
FIG. 9 shows the structure of a signal detector according to the invention in the form of a block diagram.

The two detection criteria according to equations (3) and (6) are logically combined, e.g. by means of an OR combination. The corresponding block diagram is shown in FIG. 9. The input signal s(t) present at the input DE of the detector is supplied both to an autocorrelation unit AK and to a cross correlation unit CK. The output signals $c_1(t)$ and $c_2(t)$, respectively, of the two correlation units AK and CK are logically combined with one another by means of a logic unit VE. The logic unit VE checks the conditions according to equations (3) and (6) and internally generates in each case a logic state "1" if the respective condition is met. These logic signals are OR-combined in the logic unit VE. At the output DA of the OR element (not separately shown), which also forms the output of the detector 3, a detection signal d(t) can be picked up which supplies information on the presence of the useful signal. If the output DA of the OR element is at the logic state "1", this can be interpreted as presence of the useful signal.

Using the solution according to the invention, the useful signal can now also be detected reliably and rapidly under the most varied conditions. The solution according to the invention operates correctly both with distorted channels which high SNR requirements and with almost ideal channels in which the permitted SNR can be very low. This leads to an increase in the number of bursts received correctly. The number of bursts to be retransmitted drops. In consequence, a better utilization of the available bandwidth and greater data throughput is achieved.

By including the criterion based on the cross correlation (equation 6), the choice of a suitable threshold value thr_ac for the autocorrelation also becomes simpler since it can be left at a higher value in order to achieve a lower probability of faulty detection.

Instead of the OR element for logically combining the two correlation units AK and CK, the two outputs of the correlation units AK and CK can also be logically combined with one another by means of a weighting unit. The output signals $c_1(t)$ and $c_2(t)$ can be weighted in addition to the scaling, i.e. the consideration of the signal power or of the signal amplitude according to equations (3) and (6). The logical combining can be, e.g. a threshold decision of the scaled, weighted and added output signals $c_1(t)$ and $c_2(t)$ of the autocorrelation unit AK and of the cross correlation unit CK.

The weighting makes it possible to adjust the relative influence of the two detection mechanisms (autocorrelation, cross correlation) on the decision as desired.

Figure 1:
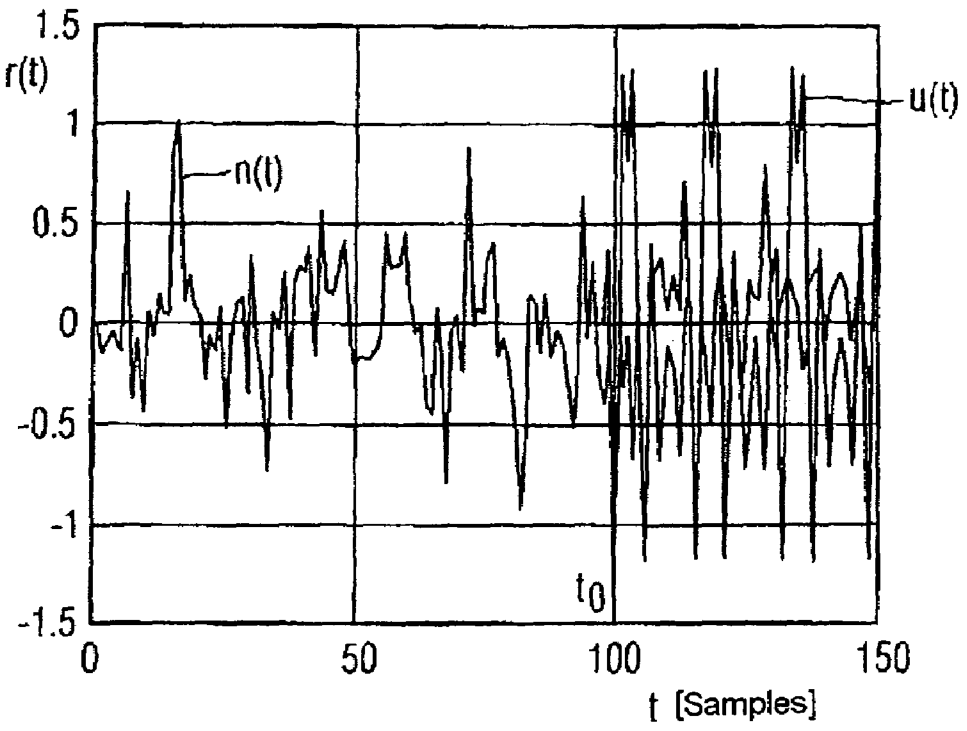
FIG. 1 shows a timing diagram of a noise signal to be evaluated, on which a periodic signal is superimposed.
Figure 2:
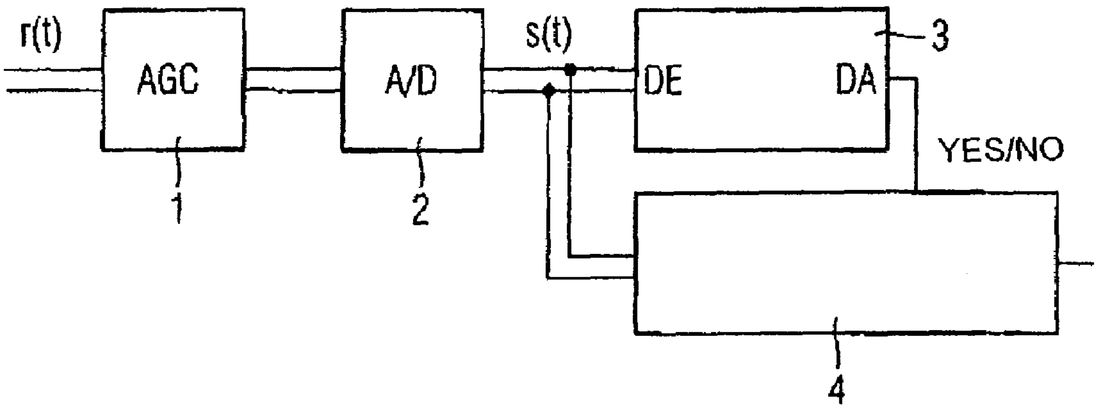
FIG. 2 shows a block diagram of a possible application of a signal detector for detecting the periodic signal.
Figure 3:
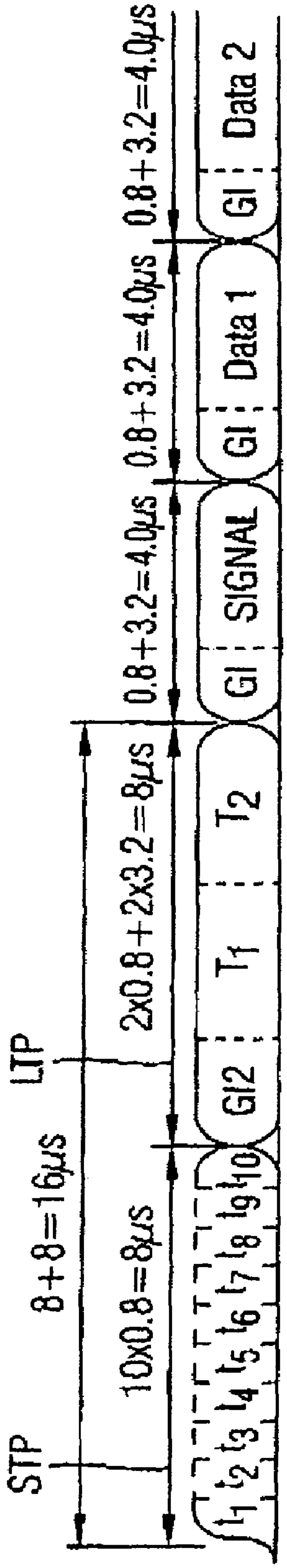
FIG. 3 shows a burst structure as described in the IEEE specification.
Figure 4:
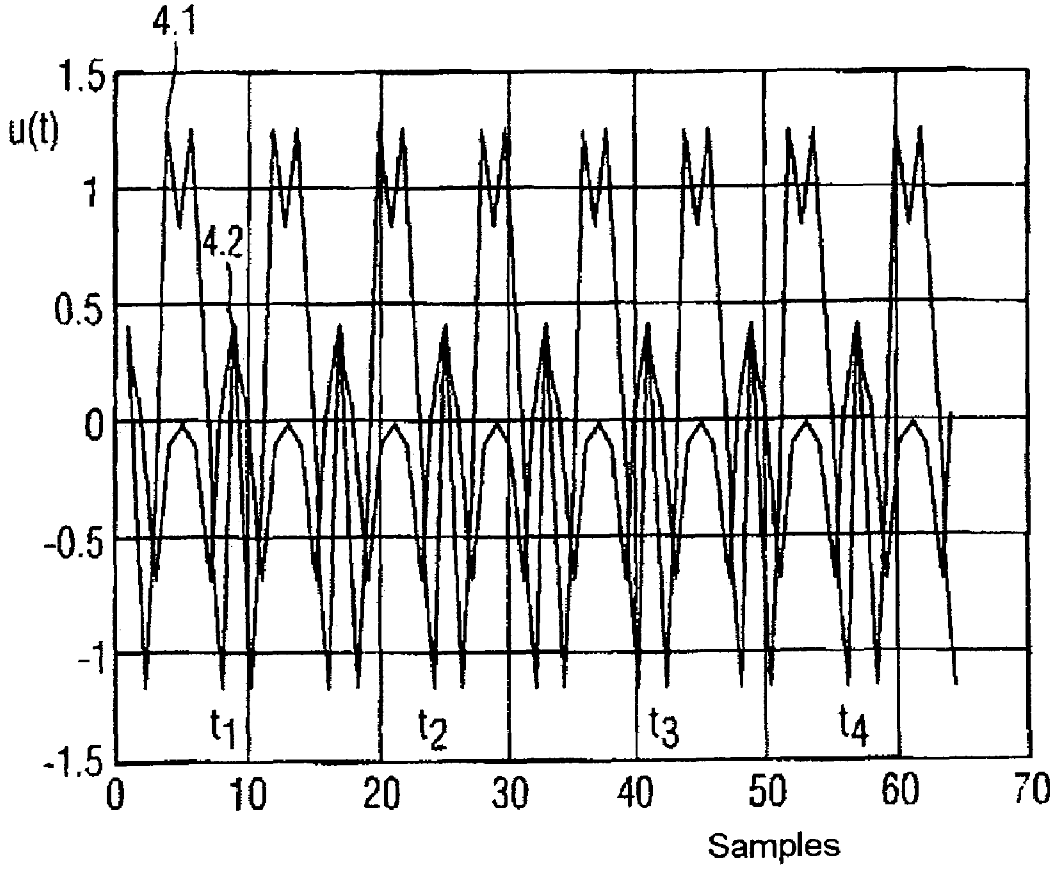
FIG. 4 shows a timing diagram of the signal during the transmission of the training sequence preamble of FIG. 3.
Figure 5:
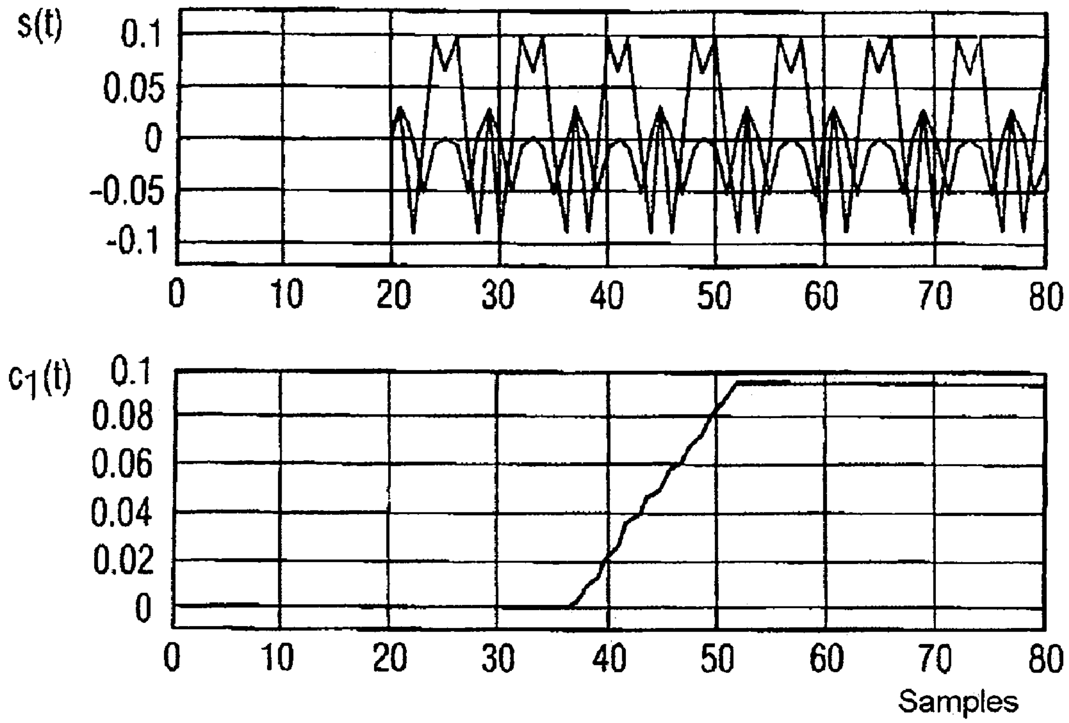
FIG. 5 shows the signal variation of a signal present at the input of the signal detector and the associated variation of the autocorrelation function.
Figure 6:
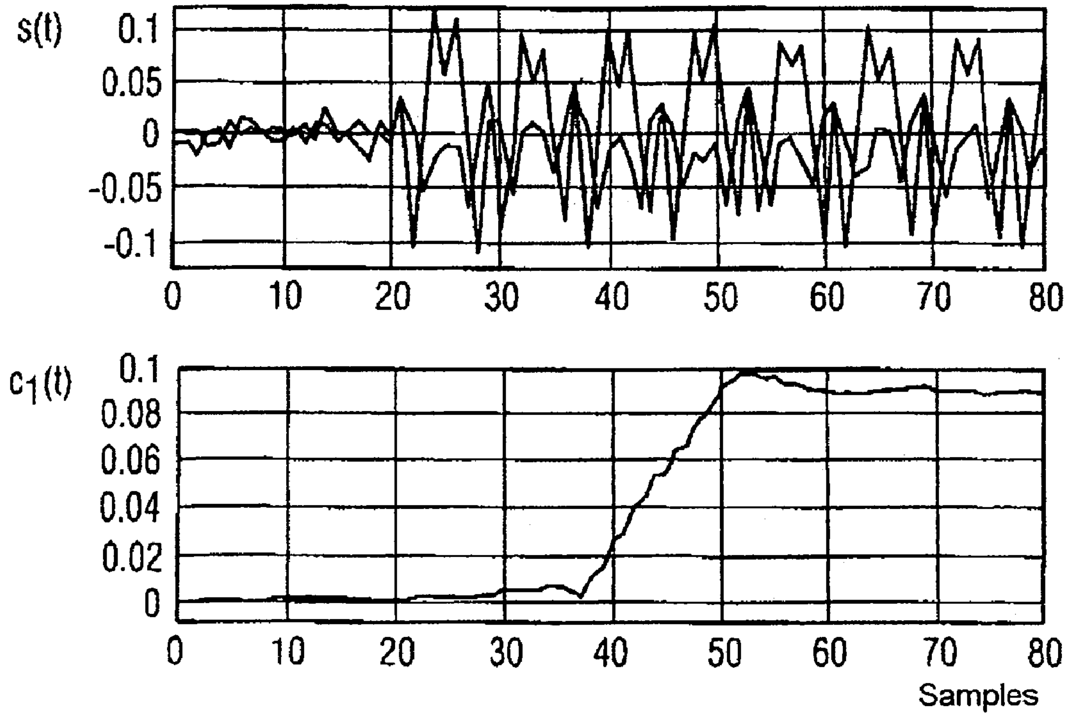
FIG. 6 shows the signal variation of a signal exhibiting a noise component and present at the input of the signal detector and the associated variation of the autocorrelation function.
Figure 7:
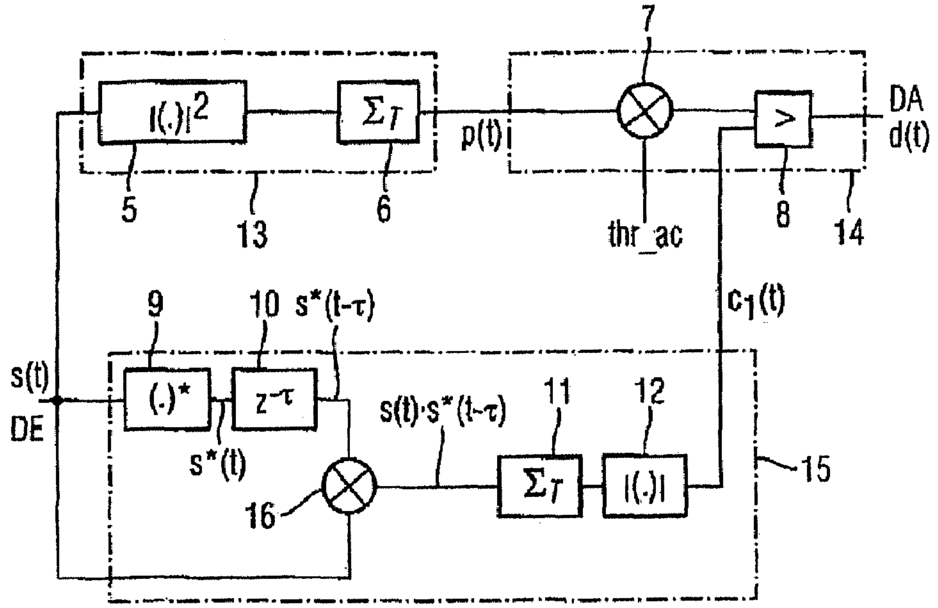
FIG. 7 shows a block diagram of the structure of a signal detector analogously to the prior art.

The input DE of the signal detector 3 according to the invention as shown in FIG. 8 can be connected to the output of the analog/digital converter 2, see FIG. 2. At the input DE of the detector 3, the input signal s(t) can then be applied which is the complex digital output signal of the analog/digital converter 2.

The embodiment of the invention shown in FIG. 9 is not restricted to detecting only the useful signal according to the two above-mentioned specifications. The invention can also be used for detecting real signals.

Furthermore, it is pointed out that in the present document, the term "autocorrelation" not only includes the correlation of the signal s(t) with itself as specified in equation (1), but also the correlation of the signal s(t) with a (time-delayed and conjugate complex) signal derived from the signal s(t). This means that the autocorrelation signal $c_1(t)$ can also be formed, e.g. according to the equation $$c_1(t) = \left| \sum_{t_i}^{t_i+T} s(t)(sgn(s(t-\tau)))^* \right| \tag{7}$$

where sgn(x) is the sign of the complex signal s(t) and, in the complex-valued case, is defined according to $$\mathrm{sgn}(x)=\mathrm{sgn}(Re(x))+j\cdot\mathrm{sgn}(Im(x)) \quad (8)$$

where j is the imaginary unit. Since the amplitude of the signal sgn(S(t−τ))* is constant, the autocorrelation signal $c_1(t)$ must also be scaled with the mean signal amplitude m(t) and not with the power p(t) in this case. I.e. the unit for power estimation 13 can be omitted and only a unit for signal amplitude estimation according to equation (5) is needed which can be implemented with much less expenditure than the unit 13 for power estimation.

It is also emphasized that in many cases the hardware required for the invention partially or even completely already exists in the receiver since the cross correlator circuit already present for signal synchronization can also be used for the cross correlation.

I claim:

1. A radio receiver comprising:

a detector for detecting the presence of a useful signal containing a periodic signal, comprising:

an autocorrelation unit for autocorrelating a signal in which the useful signal can be present, a cross-correlation unit for cross correlating the signal, in which the useful signal can be present, with a known signal, and a logic unit for logically combining the outputs of the autocorrelation unit and of the cross correlation unit, wherein the logic unit outputs a combinatonal signal which specifies whether the useful signal is present in the signal.

2. The radio receiver as claimed in claim 1, wherein the radio receiver comprises an amplitude estimating unit for estimating the amplitude of the signal, and in that the amplitude estimation signal output by the amplitude estimating unit is supplied to the logic unit.

3. The radio receiver as claimed in claim 1, wherein the radio receiver comprises a power estimating unit for estimating the power of the signal, and in that the power estimation signal output by the power estimating unit is supplied to the logic unit.

4. The radio receiver as claimed in claim 1, wherein the logic unit comprises the following:

a first decision unit, connected downstream of the autocorrelation unit, which outputs a first logical signal which specifies whether the useful signal has been detected by autoconelation, a second decision unit connected downstream of the cross correlation unit, which outputs a second logical signal which specifies whether the useful signal has been detected by cross correlation, and an OR element, connected downstream of the two decision units, which outputs the combinatorial signal.

5. The radio receiver as claimed in claim 1, wherein the logic unit is constructed in such a manner that it weights the output signal of the autocorrelation unit and the output signal of the cross correlation unit and logically combines the weighted output signals in order to generate the combinatorial signal.

6. The radio receiver as claimed in claim 5, wherein the logical combination is an addition of the weighted output signals; followed by a threshold value decision.

7. The radio receiver as claimed in claim 1, wherein the known signal used for the cross correlation is the periodic signal of the useful signal to be detected, or a signal obtained from the periodic signal of the useful signal to be detected by a signal transformation, especially a sign formation.

8. A method of using of the radio receiver as claimed in claim 1 in a wireless local area network, defined by the IEEE 802.11a standard or the IEEE 802.11g standard or the ETSI TS 101 761-1 (BRAN), Hiperlan type 2, standard.

9. A method for detecting the presence of a useful signal in a radio receiver, the useful signal containing a periodic signal, the method comprising:

correlating, with the radio receiver, a signal, in which the useful signal can be present, with itself by means of autocorrelation and an autocorrelation signal is formed;

correlating, with the radio receiver, the signal, in which the useful signal can be present, with a known signal by means of cross correlation and forming a cross correlation signal;

logically combining, with the radio receiver, the auto correlation signal and the cross correlation signal with one another and forming a combinatorial signal which specifies whether the useful signal is present in the signal.

10. The method as claimed in claim 9, comprising:

estimating, with the radio receiver the amplitude of the signal, wherein the combinatorial signal is dependent on the result of the estimating of the amplitude.

11. The method as claimed in claim 9, comprising:

estimating, with the radio receiver, the power of the signal, wherein the combinatorial signal is dependent on the result of the estimating of the power.

12. The method as claimed in claim 9, comprising:

forming, with the radio receiver, in dependence on the autocorrelation signal, a first logical signal which specifies whether the useful signal has been detected by autocorrelation;

forming, with the radio receiver, in dependence on the cross correlation signal, a second logical signal which specifies whether the useful signal has been detected by cross correlation; and logically combining, with the radio receiver, the two logical signals by an OR operation for forming the combinatorial signal.

13. The method as claimed in claim 9, comprising:

weighting, with the radio receiver, the autocorrelation signal and the cross con-elation signal, for forming the combinatorial signal; and logically combining, with the radio receiver, the weighted autocorrelation signal and the weighted cross correlation signal for generating the combinatorial signal.

14. The method as claimed in claim 13, comprising:

adding, with the radio receiver, the weighted autocorrelation signal and the weighted cross correlation signal for generating the combinatorial signal and the added signal is subjected to a threshold decision.

15. The method as claimed in claim 9, wherein the useful signal is a useful signal in a wireless local area network, defined by the IEEE 802.11a standard or the IEEE 802.11g standard or the LIST TS 101 761-1 (BRAN), Hiperlan Type 2, standard.

16. A radio receiver, comprising:

a detector for detecting the presence of a useful signal containing a periodic signal, comprising:

an autocorrelation unit for autocorrelating a signal in which the useful signal can be present, a cross-correlation unit for cross correlating the signal, in which the useful signal can be present, with a known signal, a logic unit for logically combining the outputs of the autocorrelation unit and of the cross correlation unit, wherein the logic unit outputs a combinatorial signal which specifies whether the useful signal is present in the signal, an amplitude estimating unit for estimating the amplitude of the signal, and in that the amplitude estimation signal output by the amplitude estimating unit is supplied to the logic unit, and a power estimating unit for estimating the power of the signal, and in that the power estimation signal output by the power estimating unit is supplied to the logic unit.

17. The radio receiver as claimed in claim 16, wherein the logic unit comprises the following:

a first decision unit, connected downstream of the autocorrelation unit, which outputs a first logical signal which specifies whether the useful signal has been detected by autocorrelation, a second decision unit connected downstream of the cross correlation unit, which outputs a second logical signal which specifies whether the useful signal has been detected by cross correlation, and an OR element, connected downstream of the two decision units, which outputs the combinatorial signal.

18. The radio receiver as claimed in claim 16, wherein the logic unit is constructed in such a manner that in each case it weights the output signal of the autocorrelation unit and the output signal of the cross correlation unit and logically combines the weighted output signals in order to generate the combinatorial signal.

19. The radio receiver as claimed in claim 18, wherein the logical combination is an addition of the weighted output signals; followed by a threshold value decision.

20. The radio receiver as claimed in claim 16, wherein the known signal used for the cross correlation is the periodic signal of the useful signal to be detected, or a signal obtained from the periodic signal of the useful signal to be detected by a signal transformation, especially a sign formation.

* * * * *

UNITED STATES PATENT AND TRADEMARK OFFICE

CERTIFICATE OF CORRECTION

PATENT NO. : 7,631,029 B2
APPLICATION NO. : 11/091956
DATED : December 8, 2009
INVENTOR(S) : Marsili It is certified that error appears in the above-identified patent and that said Letters Patent is hereby corrected as shown below:

Column 9, line 29, delete "combinatonal" and insert in place thereof --combinatorial--.

Signed and Sealed this

Thirtieth Day of March, 2010

David J. Kappos

*Director of the United States Patent and Trademark Office*